(12) United States Patent
Andel

(10) Patent No.: US 7,481,729 B2
(45) Date of Patent: Jan. 27, 2009

(54) LIGHTWEIGHT SPROCKET

(75) Inventor: Tomás Andel, Rudná (CZ)

(73) Assignee: Supersprox, a.s., Prague (CZ)

( * ) Notice: Subject to any disclaimer, the term of this patent is extended or adjusted under 35 U.S.C. 154(b) by 660 days.

(21) Appl. No.: 10/525,347

(22) PCT Filed: Aug. 25, 2003

(86) PCT No.: PCT/CZ03/00048

§ 371 (c)(1),
(2), (4) Date: Feb. 22, 2005

(87) PCT Pub. No.: WO2004/018902

PCT Pub. Date: Mar. 4, 2004

(65) Prior Publication Data
US 2005/0233850 A1 Oct. 20, 2005

(30) Foreign Application Priority Data
Aug. 26, 2002 (CZ) .................... 2002-2897

(51) Int. Cl.
F16H 55/12 (2006.01)
(52) U.S. Cl. ...................................... 474/162
(58) Field of Classification Search .............. 474/152, 474/160–162
See application file for complete search history.

(56) References Cited

U.S. PATENT DOCUMENTS

| 969,237 | A | * | 9/1910 | Woolnough et al. ........... 74/448 |
| 1,115,557 | A | * | 11/1914 | Livermore .................... 74/439 |
| 3,685,391 | A | * | 8/1972 | Gapp et al. .................... 411/70 |
| 2003/0199351 | A1 | * | 10/2003 | Nichols ....................... 474/160 |

* cited by examiner

Primary Examiner—Richard WL Ridley
Assistant Examiner—Terence Boes
(74) Attorney, Agent, or Firm—Notaro & Michalos P.C.

(57) ABSTRACT

The present invention relates to lightweight sprocket, consisting of a central portion (1) made from light metal alloy, to which a peripheral toothed portion (2) made from ferrous alloy is joined, using rivets (3) for joining said portions (1,2), where said joining is created between radial beams (21) of the peripheral toothed portion (2) and pocket-like recess (13) in the central portion (1), radial beams (21) being overlapped across bottoms of pocket-like recesses (13), and where a thickness of radial beams (21), at least over the joining area, is decreased by 10 to 60%, in relation to full thickness of said toothed peripheral portion (2), and a thickness of a bottom of the pocket-like recess (13) in the central portion (1) is decreased by 20 to 70%, in relation to full thickness of the central portion (1) of the sprocket.

8 Claims, 3 Drawing Sheets

LIGHTWEIGHT SPROCKET

TECHNICAL FIELD

The invention relates to gears, especially to sprocket wheels, intended for outside use in power transmission of motor vehicles.

BACKGROUND ART

Outside-mounted chain power transmissions are usually used for driving wheels of cycles and motorcycles. The same type of transmission was used for driving accessories in agricultural machines or in road maintenance vehicles, or in similar machines, too, but recently hydrostatic transmissions are more frequently used here. In bicycles, chain power transmission is used for a possibility to change gears in a wide range simply by guiding a chain over different diameter sprockets. In motorcycles, chain power transmission is used for its capability for transferring a relative high torque, when a weight of such a sort of gear is relative low. When comparing with toothed gear without a chain or similar transmission member, another advantage is apparent in use of chain power transmissions, too. In such a sort of gear there is not so high need for driving and driven wheels to be fully in-line, and also the driving and the driven sprockets can slightly change their axis spacing. In a motorcycle, a weight of a driven road wheel, including a driven sprocket and other accessories, is substantive for ability of a tire to follow the road surface profile and so for having the best contact with said road surface. This is needed especially when a driving speed is high and/or the road profile is rough. This is the reason for making a rear driving wheel as lightweight as possible, especially for road going motorcycles and for off road motorcycles. And for making a lightweight rearwheel it is substantive to make a lightweight rear wheel sprocket. Usually, these sorts of lightweight sprockets are made from light alloys. Light alloy sprockets have not so hard surface, they are not so wear resistant as steel sprockets, so their life is shorter. In some areas of machinery engineering it is known to create more resistant surfaces by welding more resistant materials over those surfaces, or by joining, for example, basic parts of cutting tools with more resistant cutting edges, blades or bits. For heavy duty gears it is known to join the teeth made from more resistant material with a central part of the gear, using bolts. But, unfortunately, those solutions are not convenient for sprockets of motorcycles. The constructions described above are too complicated from a technological point of view, and they are rather expensive, too. In the area of bicycles, it is known using sprockets which are composed of two parts—a central part and a peripheral part with teeth, both parts joined together by bolts, where a possibility of changing a peripheral part for another, having different number of teeth, or having new teeth instead of old and worn teeth, is reached this way. For sprockets in usual bicycle use it is not so substantive to have especially low weight and especially precise centering, because a driving speed of a bicycle and a rotation speed of its sprocket are relative low. In the area of motorcycles the situation is different. Here the rotation speed of sprockets is higher, so the demand for better centering of said sprockets is higher, too. The transmission of a considerably higher power and the influence of vibrations result in demand for more resistant sprocket, with lower own weight.

DISCLOSURE OF INVENTION

The present invention provides a lightweight sprocket, consisting of a central portion made from light metal alloy, to which a peripheral toothed portion made from ferrous alloy is joined, using rivets for joining said portions, where said joining is created between radial beams of the peripheral toothed portion and pocket recesses in the central portion, radial beams being overlapped across bottoms of the pocket recesses, and where a thickness of radial beams, at least over the joining area, is decreased by 10 to 60%, in relation to full thickness of said toothed peripheral portion, and a thickness of a bottom of the pocket recess in the central portion is decreased by 20 to 70%, in relation to full thickness of the central portion of the sprocket. An object of the invention is to provide an improved sprocket which is both lightweight and economical in construction and operation and which provides an increased service life for the drive system in which it is installed. Another object of the invention is to provide said sort of sprocket, where a centering of the peripheral toothed portion in relation to the central portion acts over an outer circumference of the central portion of said sprocket. The centering constructed this way is sufficiently precise. A further object of the invention is to provide said sprocket, where the rivets for joining the central portion with the peripheral toothed portion are made of titanium alloy or stainless steel alloy. So high strength and high corrosion resistance of fasteners is achieved. A still further object of the invention is to provide said sprocket, where a side clearance between the radial beams of peripheral toothed portion and side walls of the pocket recesses of the central portion is from 0,5 to 10% of the rivet shank diameter. A yet further object of the invention is to provide said sprocket, where lightening openings are created in the central portion of the sprocket. In this case it could be advantageous to create at least a circumferential strip between said lightening openings and the outer circumference of the central portion, where the thickness of said strip, in radial direction, is at least 50% of the full thickness of said central portion. In this case it could be advantageous, too, to create a wall between the lightening openings and the pocket recesses of the central portion, where a height of said wall is the same as the full thickness of said central portion and a width of said wall is at least 50% of the full thickness of said central portion of the sprocket.

So the lightweight and rigid sprocket is created, with long life toothed portion and with very precise centring. Because the peripheral toothed portion has a long service life it is not substantive that there is no possibility to change said portion separately, because of its being fastened to the central portion by riveting. The whole sprocket will be changed when needed, but after a relative long time.

Substantive objects of the invention will be evident from the following detailed description when read in conjunction with the accompanying drawings. It is to be understood that the invention is not limited in its application to the details of construction and the arrangements of the components set forth in the following description or illustrated in the drawings.

BEST MODE FOR CARRYING OUT THE INVENTION

Figure 1:
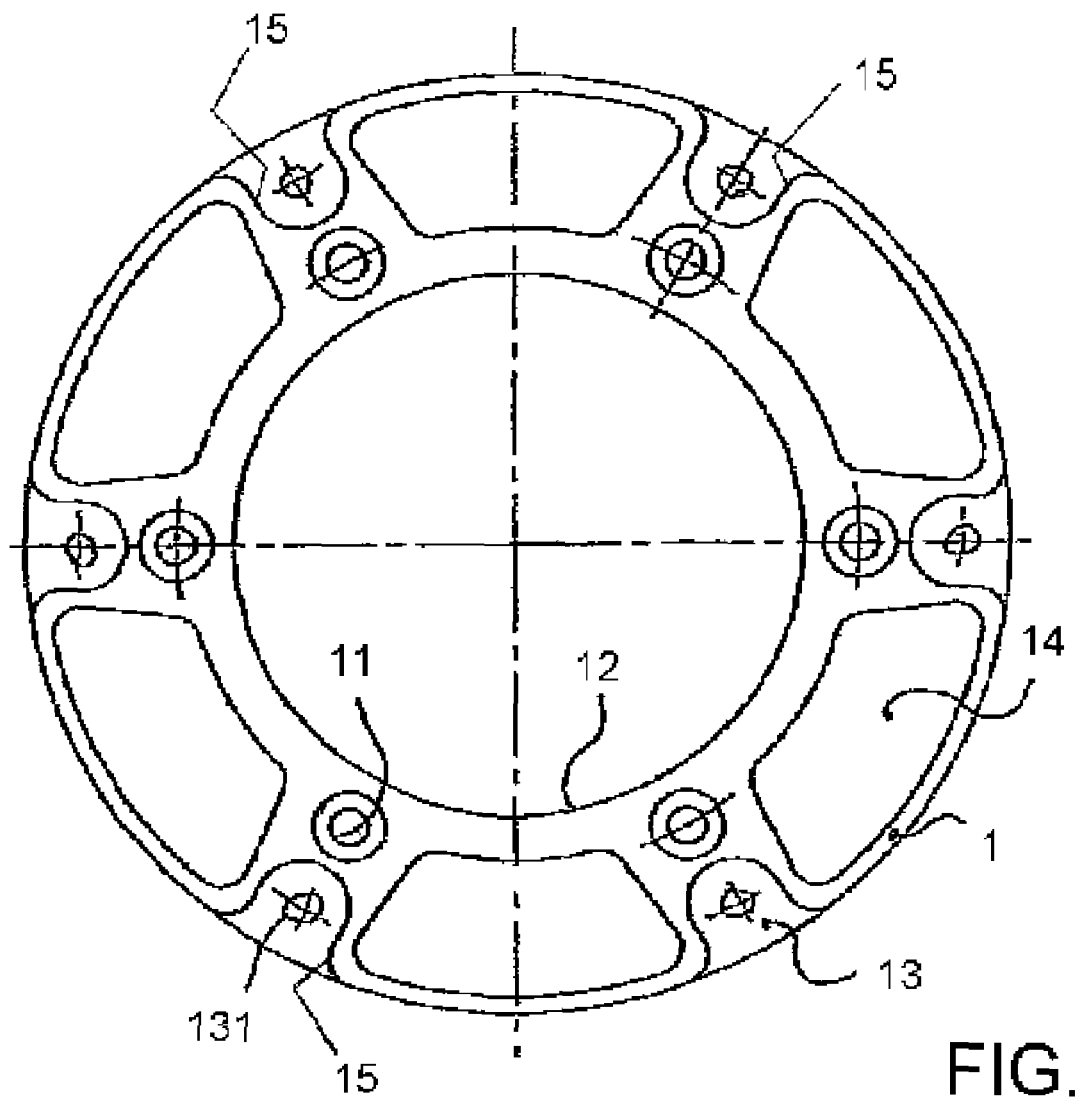
FIG. 1 is a plan view of the central portion of the sprocket, according the present invention.
Figure 2:
FIG. 2 is a cross-section view of the central portion from FIG. 1.
Figure 3:
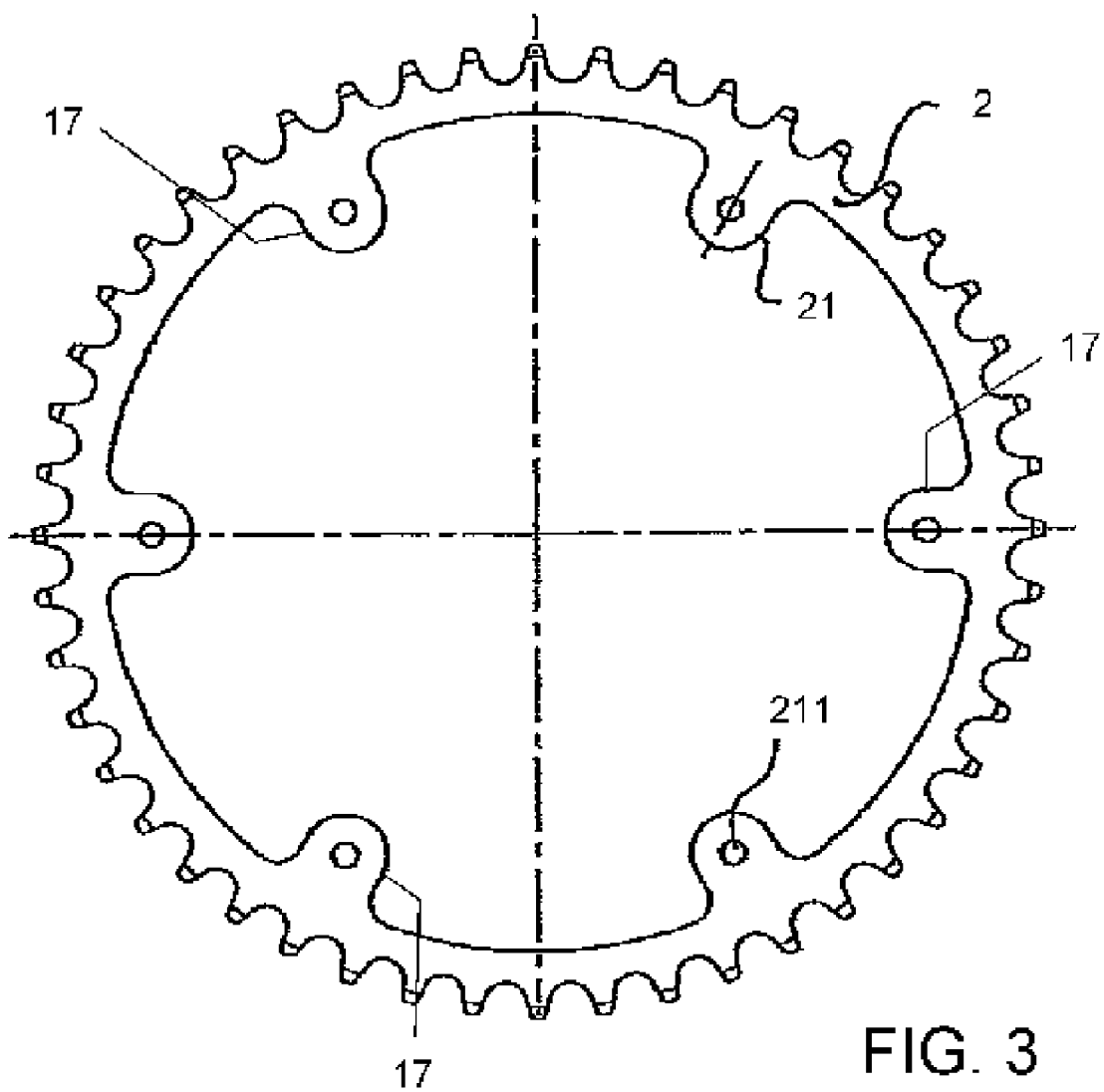
FIG. 3 is a plan view of the peripheral toothed portion of the sprocket, according to the present invention.
Figure 4:
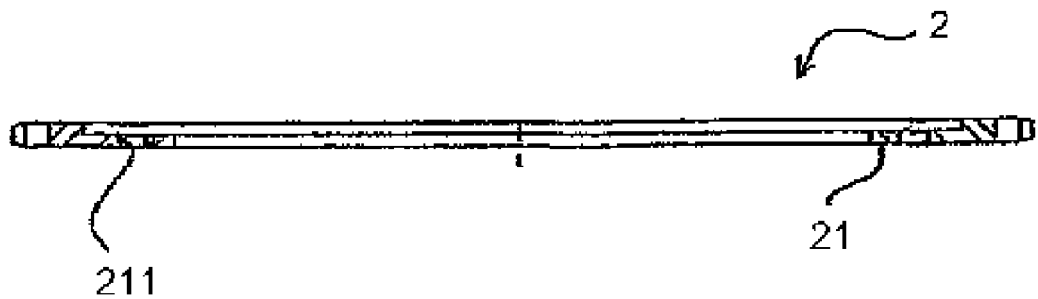
FIG. 4 is a cross-section view of the peripheral toothed portion from FIG. 3.
Figure 5:
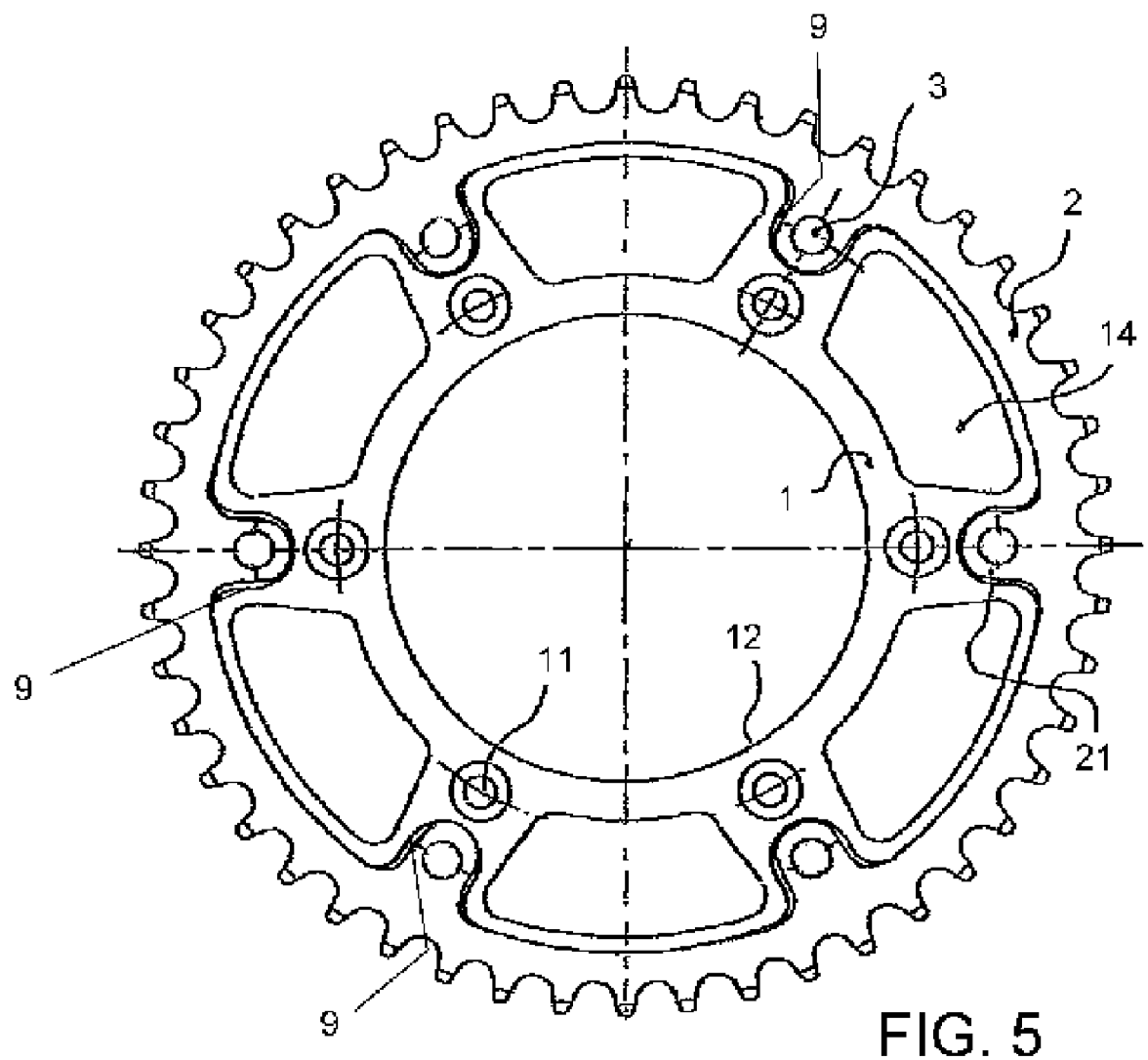
FIG. 5 is a plan view of the whole lightweight sprocket, according to the present invention.
Figure 6:
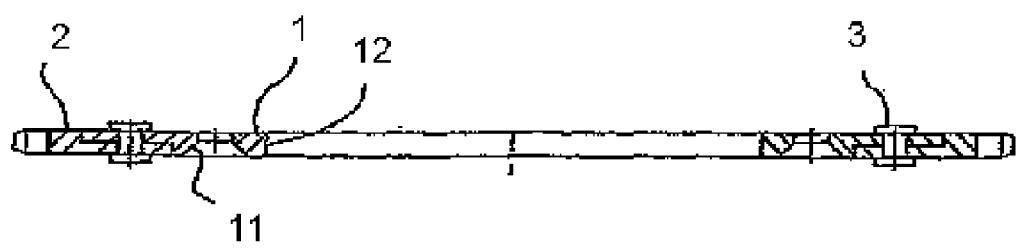
FIG. 6 is a cross-section view of the sprocket from FIG. 5, when both portions are joined together by rivets.

Lightweight sprocket consists of a central portion 1 and a peripheral toothed portion 2, which are joined together by titanium rivets 3 having a rivet shank diameter 6 mm. A centering of the peripheral toothed portion 2 in relation to the central portion 1 is provided over an outer circumference of the central portion 1, and a centering of the central portion 1, and this way a centering of the whole sprocket, in relation to a driving wheel of the motorcycle, acts over a centering opening 12, where as fastening members bolts are used, going through fastening openings 11 in the central portion 1. A thickness of both the central portion 1 and the peripheral toothed portion 2 is 6 mm, and both beams 21 of the peripheral toothed portion 2 and the central portion 1 in the area of a plurality of pocket recess 13 have, over the joining area between said central portion 1 and the peripheral toothed portion 2, their thickness decreased to 50% of their full thickness. This joining is provided as an overlapped joining, where for said joining peripheral openings 211 are arranged in a plurality of radial beams 21 of the peripheral toothed portion 2, and central openings 131 are arranged in the central portion 1, in the area of pocket recesses 13. The peripheral toothed portion 2 is created herewith radial beams 21, the thickness of which is decreased, in the described manner, by 50%, all over their surface. Central portion 1 is created here with pocket recesses 13, a circumferential walls of which having a width of 4 mm, in circumferential direction, the direction related to the whole sprocket. The circumferential clearance 9 (see FIG. 5) between the circumferential wall 15 of the pocket recess 13 and the side wall 17 of the radial beam 21 is 0,4 mm. This clearance 9 decreases when the rivets 3 are clinched and the radial beams 21 are slightly spread out by pushing a head of the rivet 3 against a surface of the radial beam 21 and by upsetting the shank of the rivet 3, so that, finally, said clearance disappears partly or completely. Big shaped lightening openings 14 are created in the central portion 1, where a circumferential strip rests along the outer circumference of the central portion 1, which strip has a width of 4 mm and goes around the central portion 1 of the sprocket, in places along the lightening openings 14. Said shaped lightening openings 14 could be created also as a plurality of smaller circular holes, for example, but always it is advantageous to keep a minimal distance from said openings 14 to the outer circumference of the central portion 1 and to the side walls of pocket recesses 13, at the rate of 50% of the full thickness of the central portion 1. Then a rigidity and a shape stability of the central portion 1 will be still sufficient. For a similar reason it is recommended to keep the depth of pocket recesses 13 so that the thickness reduction here is at least 20% of the full thickness of the central portion 1. In case of lower thickness reduction over said area there appears a danger of too high pressure between side walls of pocket recesses 13 and a lateral part of the radial beams 21 of the peripheral toothed portion 2, when high power is transmitted to said lightweight sprocket, which is a part of a motorcycle rear wheel. So this lightweight sprocket works like a part of a transmission system of a motorcycle, where as a transmission member a roller chain is used.

This sort of sprockets were produced and then the tests were done, while mounting said sprockets on plurality of high powered cross-type motorcycles. The results show the same service life of the sprockets according to the present invention as the life of usual sprockets made completely of the ferrous alloy. No damages or deformations were apparent both on a joining of the peripheral toothed portion 2 with the central portion 1 of the sprocket and on other parts or portions of all the sprockets tested.

INDUSTRIAL APPLICABILITY

The lightweight sprocket according the present invention is applicable above all for use in high performance motorcycles, as sprocket for rear driven wheel of this sort of motorcycle. Another possibilities of use appear in machines or transmissions, where lightweight sprocket with ability of precise centring and long life service is needed.

The invention claimed is:

1. A motorcycle sprocket, consisting of a central portion (1) made from a metal alloy and having pocket recesses (13), to which a peripheral toothed portion (2) made from ferrous alloy and having radial beams (21), is joined, using rivets (3) for joining said portions (1,2), which rivets are made of titanium alloy or stainless steel alloy and where said joining is created between said radial beams (21) of the peripheral toothed portion (2) and said pocket recesses (13) in the central portion (1), said radial beams (21) being overlapped across bottoms of pocket recesses (13), and where a thickness of said radial beams (21), at least over the joining area, is decreased by 10 to 60%, in relation to the full thickness of said toothed peripheral portion (2), and a thickness of a bottom of said pocket recesses (13) in the central portion (1) is decreased by 20 to 70%, in relation to full thickness of the central portion (1) of the sprocket, characterized in, that a centering of the peripheral toothed portion (2) in relation to the central portion (1) acts over an outer circumference of the central portion (1) of said sprocket and that a side clearance between the radial beams (21) of the peripheral toothed portion (2) and side walls of the pocket recesses (13) of the central portion (1) is created, said clearance being 0.5 to 10% of the rivet (3) shank diameter.

2. A sprocket, according to claim 1, characterized in, that a centering of the peripheral toothed portion (2) in relation to the central portion (1) acts over an outer circumference of the central portion (1) of said sprocket.

3. A sprocket, according to claim 1, characterized in, that lightening openings (14) are created in the central portion (1) of the sprocket.

4. A sprocket, according to claim 3, characterized in, that at least a circumferential strip is created between said lightening openings (14) and the outer circumference of the central portion (1), where the thickness of said strip, in radial direction, is at least 50% of the full thickness of said central portion (1).

5. A sprocket, according to claim 4, characterized in, that a wall is created between the lightening openings (14) and the pocket recesses (13) of the central portion (1), where a height of said wall is the same as the full thickness of said central portion (1) and a width of said wall is at least 50% of the full thickness of said central portion (1) of the sprocket.

6. A sprocket, according to claim 1, characterized in that the radial beams (21) include side walls (17).

7. A sprocket, according to claim 1, characterized in that the pocket recesses (13) include circumferential walls (15).

8. A sprocket, according to claim 1, characterized in that the radial beams (21) include side walls (17) and the pocket recesses (13) include circumferential walls (15).

* * * * *